United States Patent [19]
Vismara

[11] Patent Number: 5,890,785
[45] Date of Patent: Apr. 6, 1999

[54] CONTAINER COMPARTMENT IN PARTICULAR FOR REFRIGERATORS AND SIMILAR HOUSEHOLD ELECTRICAL APPLIANCES

[75] Inventor: Mario Vismara, Casatenovo, Italy

[73] Assignee: Devi S.p.A., Besana Brianza, Italy

[21] Appl. No.: 993,563

[22] Filed: Dec. 18, 1997

Related U.S. Application Data

[62] Division of Ser. No. 659,927, Jun. 7, 1996, Pat. No. 5,730,516.

[30] Foreign Application Priority Data

Jun. 8, 1995 [IT] Italy ................................ MI950407 U

[51] Int. Cl.[6] .................................................... A47B 96/04
[52] U.S. Cl. ........................ 312/406; 312/406.2; 312/409
[58] Field of Search ..................................... 312/400, 401, 312/406, 406.1, 406.2, 409, 236; 220/467; 62/440, 451, 452, 453

[56] References Cited

U.S. PATENT DOCUMENTS

| | | | |
|---|---|---|---|
| 1,327,473 | 1/1920 | Hewitt . | |
| 2,275,365 | 3/1942 | Hintze ................................. | 312/406 X |
| 2,768,046 | 10/1956 | Evans ....................................... | 312/406 |
| 3,014,611 | 12/1961 | Marshall ........................... | 312/406.2 X |
| 3,363,957 | 1/1968 | Basch ....................................... | 312/400 |
| 3,520,581 | 7/1970 | Borghi ................................. | 312/236 X |
| 3,601,463 | 8/1971 | Watt .................................. | 312/406.1 X |
| 3,940,195 | 2/1976 | Tillman ................................ | 312/406.1 |
| 4,024,620 | 5/1977 | Torcomian . | |
| 4,426,120 | 1/1984 | Johnson et al. ..................... | 312/406 X |
| 4,574,454 | 3/1986 | Dyson ................................. | 312/409 X |
| 5,082,335 | 1/1992 | Cur et al. ............................... | 312/401 |
| 5,221,136 | 6/1993 | Hauck et al. ........................... | 312/406 |
| 5,730,516 | 3/1998 | Vismara ................................. | 312/406 |

FOREIGN PATENT DOCUMENTS

| | | |
|---|---|---|
| 494982 | 4/1977 | Australia ............................... 312/406 |
| 0408510A2 | 1/1991 | European Pat. Off. . |
| 848292 | 10/1939 | France . |
| 1315141 | 12/1963 | France . |
| 1401585 | 6/1970 | Germany ............................... 312/406 |
| 3916536A1 | 11/1990 | Germany . |
| 1136795 | 12/1968 | United Kingdom . |

*Primary Examiner*—Peter M. Cuomo
*Assistant Examiner*—James O. Hansen
*Attorney, Agent, or Firm*—Jacobson, Price, Holman & Stern, PLLC

[57] ABSTRACT

To obtain an appreciable level of insulation while at the same time achieving easy dismantling in view of material recycling, the container compartment (1, 1A) of the invention comprises a seat (9, 9A) freely housing laminar elements (10, 10A) opaque to infrared rays, preferably envelopes under vacuum.

9 Claims, 4 Drawing Sheets

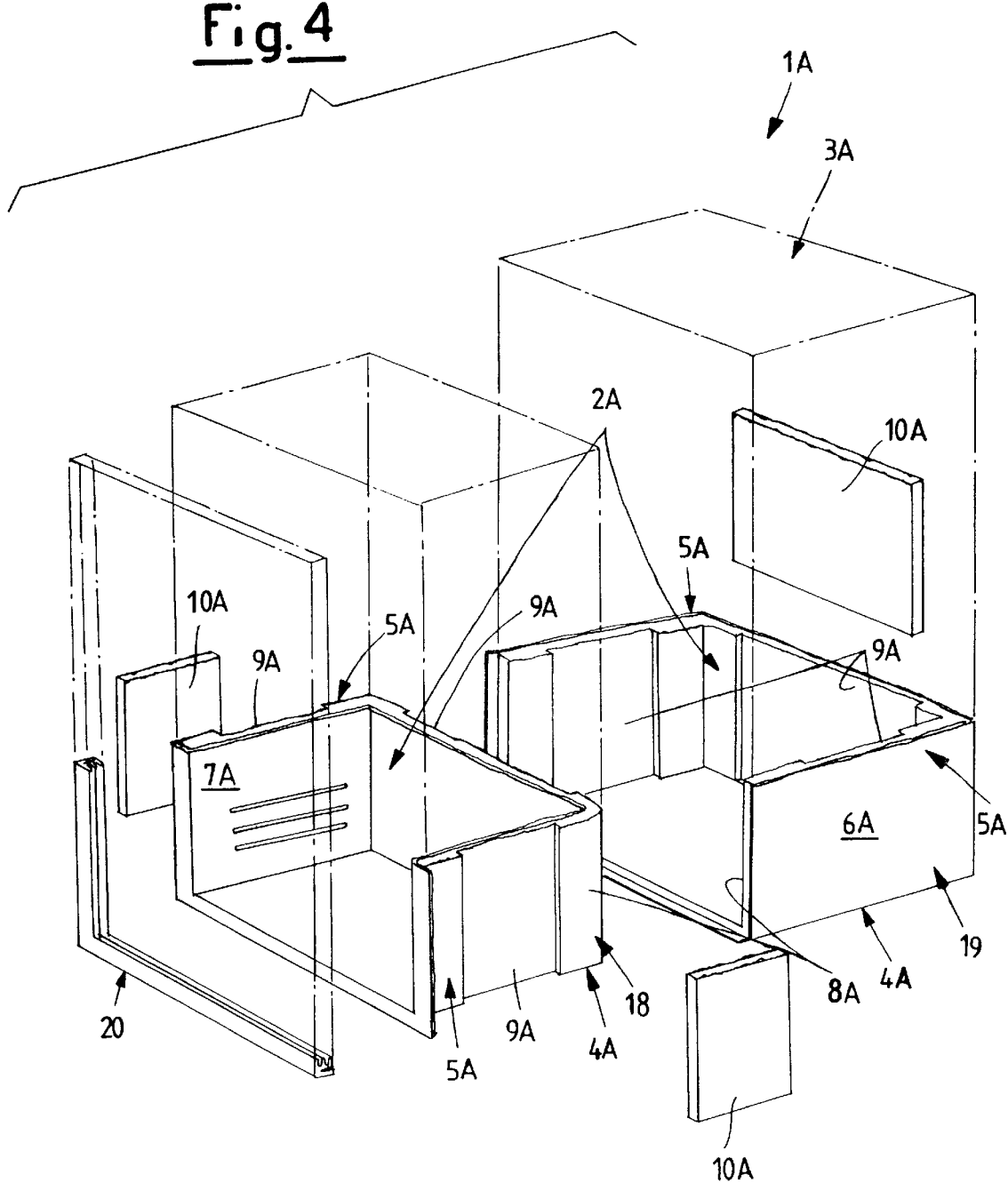

CONTAINER COMPARTMENT IN PARTICULAR FOR REFRIGERATORS AND SIMILAR HOUSEHOLD ELECTRICAL APPLIANCES

This is a divisional of application Ser. No. 08/659,927 filed Jun. 7, 1996 now U.S. Pat. No. 5,730,516.

This invention relates to an improved container compartment in particular for refrigerators and similar household electrical appliances.

In the refrigerator and freezer sector there is a particular need for constructing machines requiring the lowest possible energy consumption for their operation while at the same time able to be easily recycled when fed to demolition.

These requirements are tendentially contrasting because a reduction in energy consumption (necessarily requiring an increased insulation) imposes the use of increasingly sophisticated structures which do not facilitate dismantling, this instead being essential for machine recyclability.

The object of the present invention is to obviate the aforesaid drawback by providing a container compartment for refrigerators or freezers which compared with known refrigerator compartments of equal capacity is of tendentially high thermal insulation while at the same time being easily dismantled into related elements to facilitate recycling when fed to demolition.

The presence, within the walls, of interspaces housing laminar elements opaque to infrared rays substantially increases the coefficient of thermal insulation, however the fact that the component elements of the walls or the compartment are separable simply by removing a section bar or by withdrawing them from each other facilitates dismantling and hence recycling. Again for this purpose, the infrared-opaque elements are freely housed in their seats and can consequently be totally recovered to the extent of being able to be possibly reused in the same sector.

The invention is illustrated by way of non-limiting example in the figures of the accompanying drawings.

FIG. 4 is an exploded perspective view of a second embodiment of the container compartment according to the invention;

Figure 1:
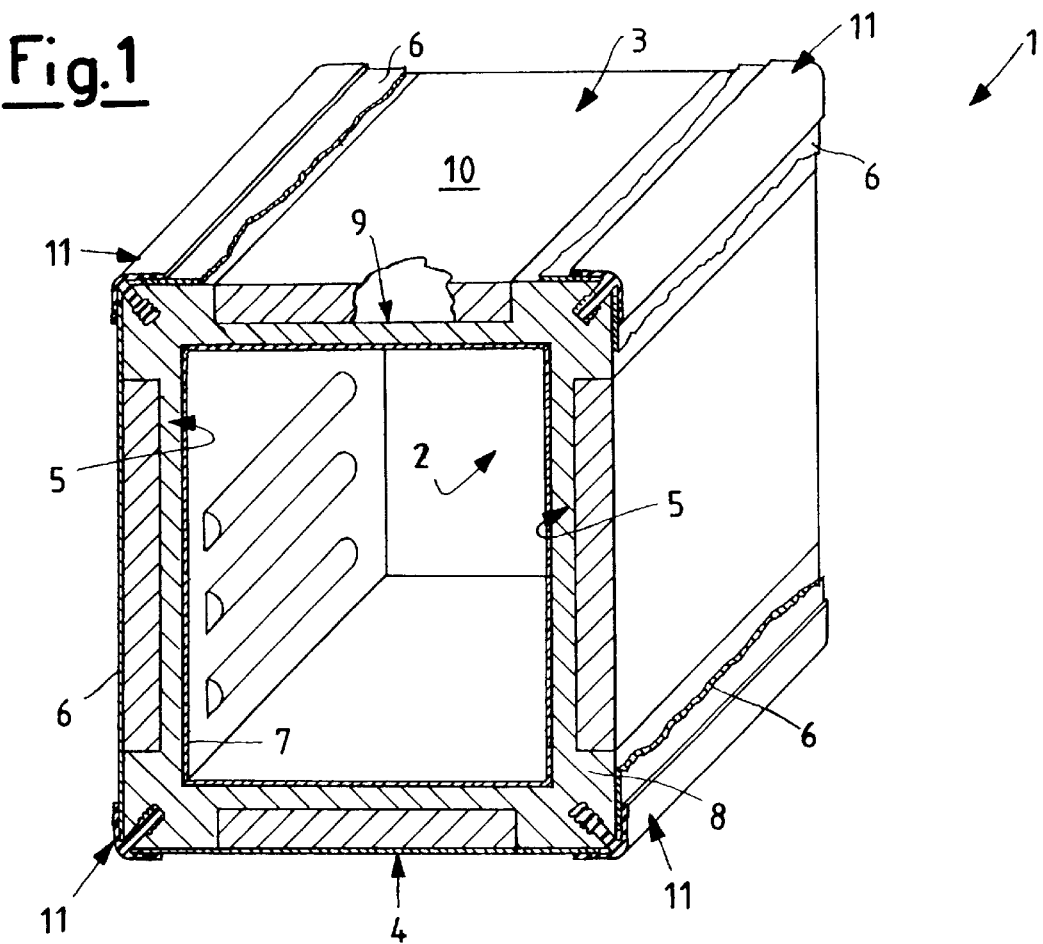
FIG. 1 is a partially broken-away perspective view of a first embodiment of the container compartment according to the invention.
Figure 2:
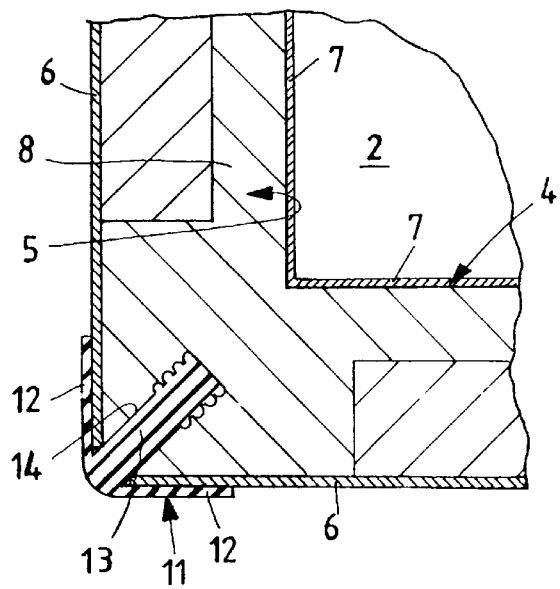
FIG. 2 is a detail of FIG. 1.
Figure 3:
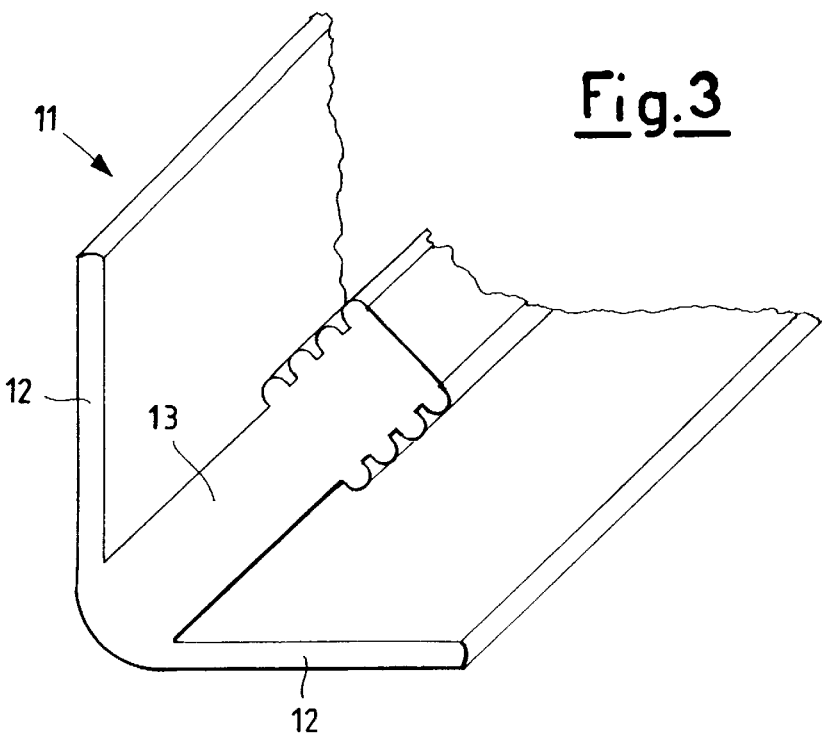
FIG. 3 is a perspective partial view of a component element of the container compartment of FIG. 1.

With particular reference to FIGS. 1–3, the first embodiment of the container compartment of the invention, indicated overall by 1, is particularly intended for the construction of refrigerators and/or freezers by applying a refrigeration unit, not shown.

It comprises a rear wall 2, a wall opposite the base wall and forming the door (not shown) of said container compartment, an upper wall 3, a lower wall 4 and two lateral walls 5.

The refrigeration unit (not shown) is preferably secured to the rear wall. Said walls have a composite structure formed from an outer sheet 6 and an inner sheet 7 of rigid material having a thickness substantially less than that of the interspace 8 between them.

The interspace 8 is filled with expanded polystyrene or other material similar in terms of thermal insulation. At least one wall chosen from the upper wall 3, the lower wall 4 and the lateral walls 5 comprises a seat 9 freely housing a laminar element 10 opaque to infrared rays. Each outer sheet 6 of the upper wall 3, lower wall 4 and lateral walls 5 is fixed to the adjacent outer sheet along the common dihedral corner by a section bar 11 of substantially T cross-section. The section bar 11 is installed such that the two equal elements or flanges 12 retain the respective outer sheets 6 adhering to the expanded polystyrene of the interspace 8 whereas the third element 13 is forced into a rectilinear groove 14 positioned along the apex of the dihedral corner of the container compartment 1. For reasons of economy, practicality and in particular structural rigidity, the inner rigid material sheets 7 are obtained directly bonded to the expanded polystyrene occupying the interspace 8 by the moulding of the expanded part.

The laminar elements 10 are formed of a material opaque to infrared rays so as to increase the thermal insulation of the container compartment 1.

Figure 7:
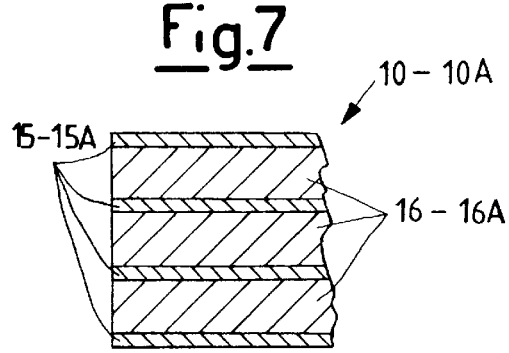
FIGS. 7 and 8 show an enlarged partial section through two elements for blocking infrared rays.

In the embodiment shown in FIGS. 1 and 2, the laminar element 10 opaque to infrared rays comprises at least one sheet of aluminium or material of similar properties. In an improved construction shown in FIG. 7, the laminar element 10 opaque to infrared rays is formed from a plurality of aluminium sheets 15 spaced apart by at least one sheet 16 of expanded polystyrene. In a further construction shown in FIG. 8, the laminar element 10 opaque to infrared rays is formed from an envelope 17 of material having such properties as to constitute a barrier towards atmospheric gases, preferably aluminium, containing at least one layer of insulating material, preferably a sheet of polystyrene 16, in which however said envelope and the material contained therein have been placed under vacuum to almost completely eliminate the thermal transmission component through the gas which would otherwise remain trapped within the envelope 17, and in the material contained in it, during its manufacture. The opacity to infrared rays is achieved either by the insulating layer or by the characteristics of the constituent material of the envelope 17. Again for reasons of economy and structural rigidity, the inner sheets 7 of rigid material, being also of polystyrene, are obtained directly bonded to the polystyrene occupying the interspace 8 by the moulding of the expanded part.

Figure 8:
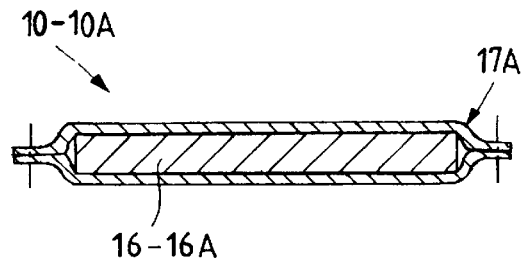

The combination of the insulation material-filled interspace 8 and the radiation-blocking laminar element 10 results in a container compartment of high thermal insulation. However it does not impede recycling because it is necessary merely to remove the section bar 11 to separate the insulating material (usually polystyrene or like materials) from the radiation-blocking material, containing heterogeneous material which is usually aluminium. The radiation-blocking laminar element 10 can be easily reused for the same purpose, especially if it takes the form of one of the more complex and hence effective constructions, such as that in which the interior of the envelope 17 forming it is under vacuum (FIG. 8). This hence represents a further contribution to the more general object of providing an ecological container compartment for refrigerators and/or freezers.

Figure 5:
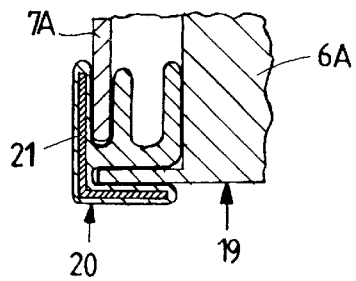
FIG. 5 is an enlarged partial section showing the joining region of the component parts of the second embodiment of the container compartment.
Figure 6:
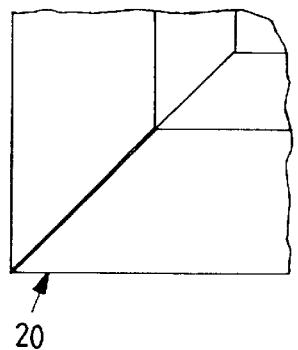
FIG. 6 shows part of a component element of the container compartment of FIG. 4.

Again in accordance with the aforesaid concepts, the container compartment according to the invention can take the form of a further embodiment shown in FIGS. 4–6. In said figures corresponding elements are indicated by the same reference numerals plus the letter "A". The same applies to FIGS. 7 and 8.

Figure 9:
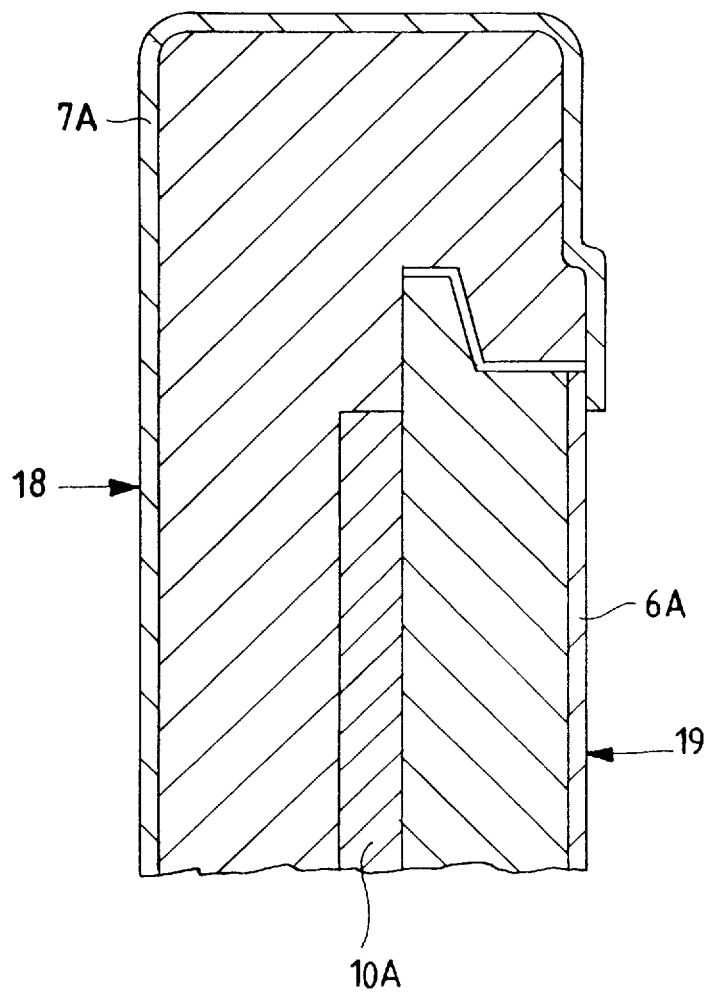
FIG. 9 is a section through a part of the compartment of the invention.

In the container compartment 1A the inner sheets 7A of rigid material (polystyrene) are obtained directly bonded to the expanded polystyrene occupying the interspace 8A by the moulding of the expanded part. Likewise, the outer sheets 6A of rigid material (polystyrene) are obtained directly bonded to the expanded polystyrene occupying the interspace 8A by the moulding of the expanded part. The container compartment 1A is divided into two portions (a first 18 and a second 19) along the centre planes of the interspace 8A, the first 18 being inserted into the second 19. Preferably the edges of the rigid-material inner sheets 7A and outer sheets 6A are joined together by an extruded section bar 20 extending along that edge of the container 1A against which the door, not shown, is to abut. The first portion 18 and second portion 19 can also be joined together in different ways, for example as shown in FIG. 9.

The plastics rim 20 comprises an internal metal core 21 for the magnetic adhesion of the door.

Again in this second embodiment of the container compartment 1A at least one wall chosen from the upper wall 3A, lower wall 4A and lateral walls 5A comprises within said interspace 8A a seat 9A freely housing a laminar element 10A opaque to infrared rays. As can be seen the seats 9A freely housing the laminar elements 10A are provided between the two portions 18 and 19 of expanded polystyrene filling the interspace 8A.

Again in this case the combination of the interspace 8A filled with insulating material and the radiation-blocking laminar element 10A results in a container compartment 1A of high thermal insulation. However the container compartment obtained in this manner does not impede recycling because it is necessary merely to withdraw the components in order to separate the insulating material (usually polystyrene and its copolymers or like materials) from the radiation-blocking material (usually aluminium sheets) or envelope elements which can be recovered for reuse in the same sector.

The aforedescribed is also applicable to container compartments of refrigerators and/or freezers of chest type, ie those in which the door when closed lies in a substantially horizontal plane and when open lies in a substantially vertical plane.

It is important to note that the container compartment of the first embodiment (FIG. 1) and of the second embodiment (FIG. 4) differ in particular from the known art in that a single material (polystyrene and its copolymers in the described embodiments) is used both to form the load-bearing structure (outer sheets 6A and inner sheets 7 and 7A) and to form the insulating portion (interspaces 8 and 8A). Moreover the invention teaches the formation of a refrigerator cabinet by bonding the same material to different allotropic arrangements, eg expanded sintered polystyrene bonded to a rigid polystyrene film by thermoforming.

This results in an easily recycled and low-cost product as it is composed of homogeneous materials. Again, by directly moulding the expanded polystyrene onto the rigid walls 6A, 7, 7A, a product of excellent structural quality is obtained.

The addition of the laminar elements 10, 10A to the sintered polystyrene increases overall the thermal insulation capacity of the container compartment of the invention, resulting in reduced energy consumption of the refrigeration unit to be associated therewith.

The advantages deriving from the use of the technique according to the invention are considerable in that, for equal conditions:

the typical thermal resistance (lambda) of an insulating interspace based on polyurethane expanded by pentane is about 20–24 mW/km;

the typical thermal resistance (lambda) of an insulating interspace according to the invention enables lambda values of less than 16 mW/km to be achieved.

The difference and hence the advantages in terms of energy saving are apparent. In addition the lambda value of the compartment material is less sensitive to deterioration by ageing than the expanded polyurethane currently used for constructing such compartments.

The container compartment of the invention can be constructed in fewer steps than traditional compartments, which require at least the three different steps of sheet metal bending, thermoforming and foaming.

In particular, the compartment container 1A of the second embodiment is even more advantageous in that it is constructed by simply fitting together two shells 18 and 19 with the elements 17A interposed between them. The compartment container 1A can hence be precision-constructed by insertion-fitting, and thus without the use of adhesives, which would affect assembly costs and create recycling problems.

I claim:

1. An improved container compartment comprising a rear wall, a wall opposite the rear wall and forming a door of said compartment, an upper wall, a lower wall and two lateral walls, said walls having a composite structure formed from an outer sheet and an inner sheet of rigid material having a thickness substantially less than that of an interspace existing between them, said interspace being filled with expanded polystyrene, at least one wall chosen from the upper wall, the lower wall and the lateral walls comprises a seat freely housing a laminar element opaque to infrared rays;

each outer sheet of the upper wall, lower wall and lateral walls is fixed to the adjacent outer sheet along a common dihedral corner by a section bar of substantially T cross-section, of which two equal elements retain the respective outer sheets adhering to the expanded polystyrene of the interspace whereas a third element is forced into a rectilinear groove positioned along an apex of the dihedral corner, the laminar element opaque to infrared rays being formed from a plurality of aluminum sheets spaced apart by at least one sheet of expanded polystyrene.

2. A compartment as claimed in claim 1, wherein the expanded polystyrene occupying the interspace is moulded directly bonded to the inner sheets of rigid material.

3. A compartment as claimed in claim 1, wherein the laminar element opaque to infrared rays comprises at least one aluminium sheet.

4. A compartment as claimed in claim 1, wherein, the laminar element opaque to infrared rays is formed from an envelope of opaque material containing at least one sheet or layer of insulating material, said envelope being under vacuum.

5. A compartment as claimed in claim 1, wherein by moulding the polystyrene occupying the interspace directly onto the inner sheet, excellent structural loading capacity is obtained.

6. A compartment as claimed in claim 1, wherein the rigid material of the inner sheets consists of a homopolymer or copolymer of the expanded polystyrene occupying the interspace, so achieving better bonding between the materials and direct recycling of the compartment at the end of product life.

7. A compartment as claimed in claim 1, wherein an insulation function is performed by two different insulating elements, a first consisting of expanded polystyrene which has a modest lambda value, a second having an excellent lambda value and consisting of an envelope under vacuum.

8. A compartment as claimed in claim 7, wherein the envelope is freely housed in the seats, so allowing easy separation of the compartment and hence reuse and/or recycling of components.

9. An improved container compartment comprising a rear wall, a wall opposite the rear wall and forming a door of said compartment, an upper wall, a lower wall and two lateral walls, said walls having a composite structure formed from an outer sheet and an inner sheet of rigid material having a thickness substantially less than that of an interspace existing between them, said interspace being filled with expanded polystyrene, at least one wall chosen from the upper wall, the lower wall and the lateral walls comprises a seat freely housing a laminar element opaque to infrared rays;

each outer sheet of the upper wall, lower wall and lateral walls being fixed to the adjacent outer sheet along a common dihedral corner by a section bar of substantially T cross-section, of which two equal elements retain the respective outer sheets adhering to the expanded polystyrene of the interspace whereas a third element is forced into a rectilinear groove positioned along an apex of the dihedral corner , an insulation function being performed by two different insulating elements, a first consisting of expanded polystyrene which has a modest lambda value, a second having an excellent lambda value and consisting of an envelope under vacuum, the envelope being freely housed in the seats, so allowing easy separation of the compartment and hence reuse and/or recycling of components.

* * * * *